United States Patent
Knott et al.

(10) Patent No.: US 6,858,663 B2
(45) Date of Patent: Feb. 22, 2005

(54) ORGANOPOLYSILOXANES FOR DEFOAMING AQUEOUS SYSTEMS

(75) Inventors: Wilfried Knott, Essen (DE); Kathrin Lehmann, Leverkusen (DE); Martina Lüger, Essen (DE); Stefan Silber, Krefeld (DE)

(73) Assignee: Goldschmidt AG, Essen (DE)

( * ) Notice: Subject to any disclaimer, the term of this patent is extended or adjusted under 35 U.S.C. 154(b) by 12 days.

(21) Appl. No.: 10/619,140

(22) Filed: Jul. 14, 2003

(65) Prior Publication Data

US 2004/0229964 A1 Nov. 18, 2004

(30) Foreign Application Priority Data

Jul. 16, 2002 (DE) .......................................... 102 32 115

(51) Int. Cl.$^7$ ....................... B01D 19/04; C08K 5/5419
(52) U.S. Cl. ..................... 524/266; 524/268; 524/588; 516/124; 528/25; 528/31; 106/31.6; 106/287.13
(58) Field of Search .......................... 516/124; 524/266, 524/268, 588; 528/25, 31

(56) References Cited

U.S. PATENT DOCUMENTS

| | | | |
|---|---|---|---|
| 3,402,192 A | | 9/1968 | Haluska |
| 3,746,653 A | | 7/1973 | Churchfield |
| 3,763,021 A | | 10/1973 | Householder |
| 3,784,479 A | | 1/1974 | Keil |
| 3,865,544 A | | 2/1975 | Keil |
| 5,446,119 A | * | 8/1995 | Herzig et al. ................. 528/26 |
| 5,474,709 A | * | 12/1995 | Herzig et al. ............... 516/123 |
| 5,613,988 A | * | 3/1997 | Spiegler et al. .............. 44/320 |

FOREIGN PATENT DOCUMENTS

| | | |
|---|---|---|
| DE | 255 737 A1 | 4/1988 |
| DE | 40 32 006 A1 | 4/1992 |
| DE | 43 43 235 C1 | 12/1994 |
| DE | 195 16 360 C1 | 5/1996 |

OTHER PUBLICATIONS

Koczo et al., "Mechanisms for Antifoaming Action in Aqueous Systems by Hydrophobic Particles and Insoluble Liquids", Journal of Colloid and Interface Science, vol. 166, No. 1, pp. 225–238, Aug. 1994.

\* cited by examiner

Primary Examiner—Margaret G. Moore
Assistant Examiner—Marc S. Zimmer
(74) Attorney, Agent, or Firm—Frommer Lawrence & Haug LLP

(57) ABSTRACT

The invention relates to the use of water-insoluble organopolysiloxane derivatives of the general formula (I)

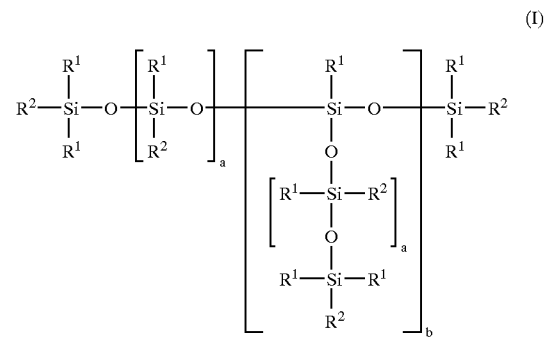

in which the radicals $R^1$ are alkyl radicals, preferably having 1 to 4 carbon atoms or aryl radicals, but at least 80% of the radicals $R^1$ are methyl radicals, and $R^2$ at least once in the molecule has the definition (a)

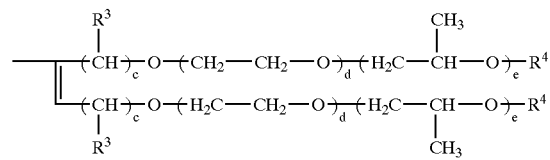

for defoaming aqueous media, especially printing inks and paints.

19 Claims, No Drawings

ORGANOPOLYSILOXANES FOR DEFOAMING AQUEOUS SYSTEMS

RELATED APPLICATIONS

This application claims priority under 35 USC §119 to German application No. 102 32 115.9, filed Jul. 16, 2002 herein incorporated by reference.

BACKGROUND OF THE INVENTION

Field of the Invention

The invention relates to the use of organopolysiloxane copolymers as defoamers for aqueous coating systems and printing inks.

Increasing numbers of coating materials and printing inks are being reformulated on an aqueous basis for greater environmental acceptability.

Because of the ingredients used—emulsifiers, wetting agents, and dispersing additives—such formulations have a strong tendency to stabilize foam. This is manifested to adverse effect not only during the production of these paints and inks but also more particularly during their application, when large quantities of air are introduced and the esthetics and physical properties of the final coatings are impaired. Consequently, in virtually all water-based systems the use of antifoams or defoamers is widespread and often indispensable.

In the past a large number of formulations have been described which envisage the use of, for example, silicone oils, organically modified siloxanes, hydrophobic polyoxyalkylenes, mineral oils, natural oils, and other hydrophobic liquids as defoaming substances. Frequently combinations of the abovementioned substances with hydrophobic solids, such as silicas, metal stearates or fatty acid amides, for example, are also used, which often reinforce the foam-inhibiting or defoaming effect.

The use of silicone oils, especially dimethylpolysiloxanes of low to medium viscosity, for the defoaming of aqueous solutions or dispersions is known and is described in, for example, the book by W. Noll "Chemie and Technologie der Silicone".

It is likewise known to use polyoxyalkylene-polysiloxane copolymers as defoamers. U.S. Pat. No. 3,763,021 describes a typical preparation for defoaming of aqueous latices, consisting of (1) from 1 to 20% by weight of a siloxane glycol copolymer of the general formula

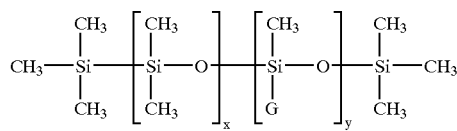

in which x has an average value of from 6 to 420 and
y has an average value of from 3 to 30, a
G is a radical of the structure

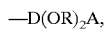
—D(OR)$_2$A, in which

D is an alkylene radical,
R is composed of ethylene radicals and propylene or butylene radicals in a ratio of ethylene radicals to the other alkylene radicals such that the ratio of carbon atoms to oxygen atoms in all blocks OR is in the range from 2.3:1 to 2.8:1, z has an average value of from 25 to 100, and
A is a capping group, (2) from 65 to 98% by weight of polypropylene glycol having an average molecular weight in the range from 1,000 to 2,000, and (3) from 1 to 15% by weight of a hydrophobic silica.

Typical preparation methods for these aforementioned polyoxyalkylene-polysiloxane copolymers are described in U.S. Pat. No. 3,402,192, U.S. Pat. No. 3,746,653, U.S. Pat. No. 3,784,479, and U.S. Pat. No. 3,865,544.

According to the present state of knowledge the defoaming activity depends critically on the ability of a defoamer to penetrate the foam lamellae and thereby to destabilize them until they burst (K. Koczo, J. K Koczone, D. T. Wasan, J. Colloid Interface Sci. 166, 225 to 238 (1994)). For this to be achieved there must be a controlled incompatibility (hydrophobicity) with the aqueous phase in which defoaming is to take place. This is because a defoamer, if it is too compatible (hydrophilic), will no longer be able to be very effective, since it will not preferentially penetrate the foam lamella. If the incompatibility is too great, the defoaming is generally very good but is frequently accompanied in that case by unwanted side effects including surface defects, adverse effects on wetting behavior, and separation phenomena.

Accordingly, the search for a suitable defoamer always involves a search for the right balance between compatibility and incompatibility for the system in which defoaming is to take place, with the objective of coming as close as possible to the target hydrophobicity/hydrophilicity equilibrium. The ongoing concern to reduce VOC (volatile organic component) levels, coupled with the desire to prevent the fogging problems on interior walls that are caused by low-volatility mineral oils or conventional plasticizes by more effective formulating, have led to a situation where a large number of traditional product designs for the defoaming of aqueous coating systems nowadays appear unsuitable.

DE-A-40 32 006 teaches a method of defoaming and/or degassing organic systems by adding an antifoam comprising an organopolysiloxane to the organic system, which may consist of diesel oil or crude oil or products from the cracking of the oil. The organopolysiloxane used is a polymer composed of siloxane units of the general formulae

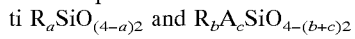
ti R$_a$SiO$_{(4-a)2}$ and R$_b$A$_c$SiO$_{4-(b+c)2}$ in which

R is a monovalent hydrocarbon radical having 1 to 18 carbon atoms per radical,
A is a radical of the general formula

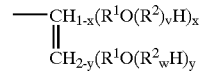

in which

R$^1$ is a radical of the formula

—CR$^3$H—,

R$^3$ is hydrogen or a monovalent organic radical,
R is a radical of the formula

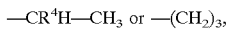
—CR$^4$H—CH$_3$ or —(CH$_2$)$_3$,

R$^4$ is hydrogen or a monovalent organic radical, v, w are each 0 or an integer, v+w being on average from 0 to 16, x, y are 0 or 1, x+y being 1 or 2, a is 1, 2 or 3, b is 0, 1 or 2, and c is 1 or 2, the sum b+c being not greater than 3.

The siloxanyl-alkenediyl-bis-ωhydroxypolyoxyalkylenes used themselves and their preparation are described in patent DD-A-2 55 737.

Adducts of alkynediol derivatives with hydrogen-functional siloxanes are therefore known.

From DE-A-195 16 30 and DE-A-43 43 235, moreover, derivatives are known which in addition to the alkynediol (alkoxylates) also describe other radicals, examples being polyether radicals, for the derivatization of the hydrogen siloxanes. These copolymers are also employed for defoaming apolar phases, such as diesel fuels.

OBJECTS OF THE INVENTION

It is an object of the present invention, however, to provide organopolysiloxanes which are particularly suitable for defoaming aqueous media and which allow the above-described desirable incompatibility/compatibility balance to be set in a targeted way while allowing significantly improved balances and ensuring much more rapid foam collapse. These and other objects will become apparent in the description of the invention.

DESCRIPTION OF THE INVENTION

This object and others are surprisingly achieved through the use of organopolysiloxane derivatives of the general formula (I) for defoaming aqueous media:

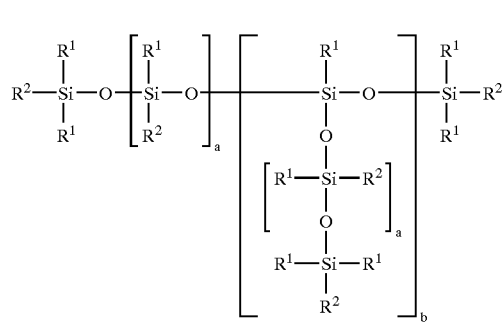

(I)

where the radicals $R^1$ are alkyl radicals, preferably having 1 to 4 carbon atoms or aryl radicals, but at least 80% of the radicals $R^1$ are methyl radicals, $R^2$ in the molecule are identical or different and can have the following definitions:

(a)

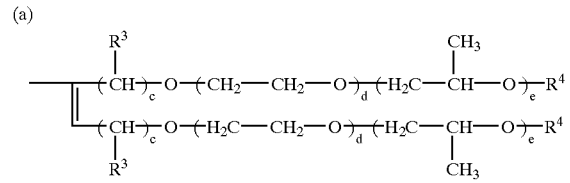

in which $R^3$ is a hydrogen or alkyl radical, $R^4$ is a hydrogen, alkyl or carboxyl radical c is a number from 1 to 20, d is a number from 0 to 50, e is a number from 0 to 50 or (b)

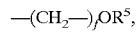

in which $R^5$ is a hydrogen, alkyl or carboxyl radical or a dimethyl propane radical containing ether groups if desired, and f is a number from 2 to 20 or c)

in which $R^1$ is a hydrogen, alkyl or carboxyl radical, g is a number from 2 to 6, h is a number from 0 to 20, i is a number from 1 to 50, j is a number from 0 to 10, k is a number from 0 to 10 or (d)

correspond to the radical $R^1$, with the proviso that in the average molecule at least one radical $R^2$ has the definition (a), a is a number from 1 to 500, preferably from 1 to 200, and in particular from 1 to 50, and b is a number from 0 to 10, preferably <5, and in particular 0 wherein the organopolysiloxane forms a clear solution in water in an amount not more that 20 g/l.

The siloxane framework can be straight-chain (b=0) or else branched (>0 to 10). The value of b and also the value of a are to be understood as average values in the polymer molecule, since the polysiloxanes for use in accordance with the invention are in the form of—generally—equilibrated mixtures. The skilled worker is well aware that, owing to their polymeric rare, the compounds are in the form of a mixture having a distribution which is governed essentially by the laws of statistics. The values for all indices therefore represent average values.

The radicals $R^1$ are alkyl radicals, preferably having 1 to 4 carbon atoms, such as methyl, ethyl, propyl or butyl radicals, or aryl radicals, in which case the phenyl radicals are preferred. For reasons of preparation and price the methyl radicals are preferred, and so at least 80% of the radicals $R^1$ are methyl radicals. Particular preference is given to those polysiloxanes in which all of the radicals $R^1$ are methyl radicals.

$R^2$ in the molecule can be identical or different with the proviso that in the average molecule at least one radical $R^2$ has the definition (a). The radicals $R^2$ are detailed below.

In the radical (a)

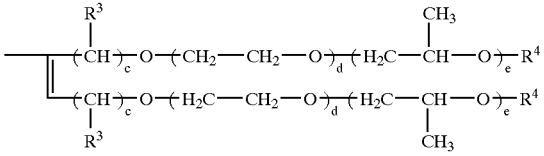

$R^3$ is a hydrogen or alkyl radical, in particular a lower alkyl radical having 1 to 4 carbon atoms. Preference is given to hydrogen.

$R^4$ is a hydrogen, alkyl or carboxyl radical, in particular an acyl radical. In one particular embodiment $R^4$ is a hydrogen. The index c is a number from 1 to 20, preferably 1. The indices
d and e are independently of one another integers from 0 to 50.

Preference is given to a radical (a) in which $R^3$ and $R^4$ are hydrogens, the index c is 1, and the indices d and e independently of one another are each from 0 to 10. These indices are, as the skilled wore is aware, average numbers, since it is known that the addition reaction of alkylene oxides such as ethylene oxide and propylene oxide onto alcohols produces a mixture of compounds with different chain lengths. These radicals (a) may be introduced into the molecule of the polysiloxane by addition reaction of correspondingly substituted alkyne derivative precursors onto SiH groups of a prior art polysiloxane in the presence of a hydrosilylation catalyst.

In the radical (b)

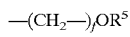

$R^5$ is a hydrogen, alkyl of or carboxyl radical or a dimethylolpropane radical with or without ether groups. Preferably $R^5$ is a hydrogen radical or a dimethylolpropane derivative. The index f is a simple number from 2 to 20, the numerical values from 3 to 6 being preferred. These radicals (b) may be introduced by means of a hydrosilylation reaction as already described above, by addition of alkenols or their derivatives onto SiH groups of the organopolysiloxane. Examples of such alkenols are allyl alcohol, hexenol or, for example, trimethylolpropane monoallyl ether In the radical (c)

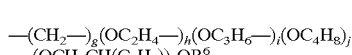

$R^6$ is a hydrogen, alkyl or carboxyl radical. Preferably $R^6$ is a hydrogen or methyl radical. The index
g is a number from 2 to 6, the index
h is a number from 0 to 20, the index
i is a number from 1 to 50, the index
j is a number from 0 to 10, and the index
k is a number from 0 to 10.

Preferably the index g has a value of 3, the index h a value from 0 to 12, and the index i a value from 8 to 30, and the indices j and k are preferably <5, in particular 0.

The radicals (c) as well may be introduced by means of a hydrosilylation reaction as already described above, by addition reaction of alkenyl polyethers or their derivatives onto SiH groups of the organopolysiloxane.

Alternatively (d) the radical $R^2$ may also correspond to the radical $R^1$, in which case, again the methyl radical is particularly preferred.

The compounds of the general formula (I) are industrial products whose incompatibility with the aqueous phase in which defoaming is to take place (hydrophobicity) is custom-tailored by way of the nature (structure) of the individual components and/or their fragments and their relative proportions in the molecule as a whole in such a way that the reaction products are insoluble in water—that is, form clear solutions in water at 25° C. to an extent of not more than 20 g/l, preferably < about 10 g/l, and in particular less than about about 5 g/l.

The key relationships affecting structure/hydrophilicity/ hydrophobicity are known to the skilled worker in the field of interface chemistry, as are the corresponding synthesis methods. Optimization measures can therefore be taken on the basis of a few rangefinding experiments.

EXAMPLES

In the examples below the preparation of organofunctionally modified organopolysiloxanes for use in accordance with the invention, of the formula I, is shown first of all.

The products prepared in these examples are designated E1 to E7.

Example E1

In a 250 ml four-necked flask equipped with KPG stirrer, dropping funnel, intensive condenser and nitrogen blanketing 51.15 g of Golpanol® BEO (butynediol etherified with about 1.1 mol of ethylene oxide) together with 11.0 g of a pendant hydrogen siloxane (SiH content: 4.62 eq/kg) were heated to 140° C. with stirring and a catalyst consisting of $H_2PtCl_6.6H_2O$ and $RuCl_3.H_2O$ in isopropanol (corresponding to 10 ppm of Pt and 10 ppm of Ru based on the overall batch) was added. Within a few minutes the SiC linking reaction began, the exothermic nature of which reaction was intensified by successive dropwise addition of the major amount of S1H-siloxane (44 g) for about 50 to 60 minutes. After around just 20 minutes the result of volumetric gas analysis on a sample was evidence of quantitative SiH conversion.

A clear, amber-colored liquid having a viscosity of 639 mPas at 25° C. was isolated.

Example E2

Following the procedure of Example 1, 42.52 g of Golpanol BEO together with 12.0 g of a pendant hydrogen siloxane (SiH content: 3.52 eq/kg) were heated to 140° C. with stirring and a catalyst consisting of $H_2PtCl_6.6H_2O$ and $RuCl_3.H_2O$ in isopropanol (corresponding to 10 ppm of Pt and 10 ppm of Ru based on the overall batch) was added. The remaining amount of SiH siloxane (48 g) was added dropwise within 60 minutes. At the end of dropwise addition the SiH conversion determined from volumetric gas analysis was quantitative.

The reaction mixture was cooled to give a clear, amber-colored liquid having a viscosity of 896 mPas at 25° C.

Example E3

In accordance with the procedure employed in Example 142.39 g of Golpanol BEO together with 12 g of a pendant hydrogen siloxane (SiH content 3.51 eq/kg; chain length: 20, degree of functionalization: 5) were heated to 140° C. with stirring and a catalyst solution consisting of $H_2PtCl_6.H_2O$ and $RuCl_3.H_2O$ in isopropanol (corresponding to 10 ppm of Pt and 10 ppm of Ru based on the overall batch) was added.

Following the addition of the major amount of hydrogen siloxane (48 g) the mixture was clear and shows no SiH hydrogen detectable by volumetric gas analysis. The viscosity of the honey-colored Golpanol BEO siloxane copolymer was 1.717 mPas at 25° C.

Example E4

To prepare an ABA-structured, Golpanol BEO siloxane block copolymer, working in analogy to Example E1, 39.51 g of Golpanol BEO together with 13.0 g of an α,ω-dihydropolydimethylsiloxane (SiH content 3.02 eq/kg, chain length 9.1) were charged to a vessel with stirring at 140° C. and a catalyst solution consisting of $H_2PtCl_6.6H_2O$ and $RuCl_3.H_2O$ in isopropanol (corresponding to 10 ppm of Pt and 10 ppm of Ru based on the overall batch) was added. Over the course of an hour the major amount of the linear hydrogen siloxane (52 g) is added dropwise, with SiH conversion already being found quantitative at the end of the metered addition.

Cooling gave a clear, amber-colored liquid having a viscosity of 207 mPas at 25° C.

Example E5

In a 250 ml four-necked flask equipped with KPG stirrer, dropping funnel, intensive condenser and nitrogen blanketing 42.31 g of Golpanol BEO together with 50.0 g of a pendant hydrogen siloxane (SiH content: 4.67 eq/kg) and 8.62 g of an allyl polyether (M: 382 g/mol) were heated to 120° C. with stirring and 25 ppm of Karstedt catalyst were added. Over the course of 85 minutes following addition of the catalyst the reaction mixture attains quantitative SiH conversion.

The liquid isolated was clear and amber-yellow.

Example E6

An inertized apparatus analogous to that of Example E5 was charged with 36.28 g of Golpanol BMP (monopropoxylated diol) together with 13 g of a pendant hydrogen siloxane (SiH content: 3.52 eq/kg) at 135° C. with stirring and a catalyst solution consisting of $H_2PtCl_6 \cdot 6H_2O$ and $RuCl_3 \cdot H_2O$ in isopropanol (corresponding to 10 ppm of Pt and 10 ppm of Ru based on the overall batch) was added. Over the course of an hour the remaining 52 g of the hydrogen siloxane were added dropwise. After 70 minutes the clear reaction mixture retains quantitative SiH conversion.

A yellow copolymer was obtained.

Example E7

A 250 ml flask-necked flask equipped with KPG stirrer, dropping funnel, intensive condenser and nitrogen blanketing was charged with 50.0 g of a pendant hydrogen siloxane (SiH content 4.67 eq/kg) at 140° C. with stirring and a catalyst solution consisting of $H_2PtCl_6 \cdot 6H_2O$ and $RuCl_3 \cdot H_2O$ in isopropanol (corresponding to 10 ppm of Pt and 10 ppm of Ru based on the overall batch) was added Over the course of 20 minutes 40.34 g of trimethylolpropane monoallyl ether diacetate and then over the course of 15 minutes, 15.65 g of Golpanol BEO are added dropwise. After the end of dropwise addition the batch was held at reaction temperature with stirring for 1 hour. Determination of SiH by volumetric gas analysis shows an SiH conversion of 99.2%.

The clear yellow product was a liquid having a viscosity of 279 mPas.

Examples of organopolysiloxanes for use in accordance with the invention are products having the following average structures:

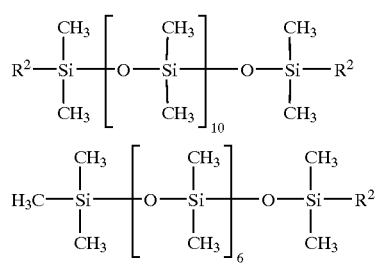

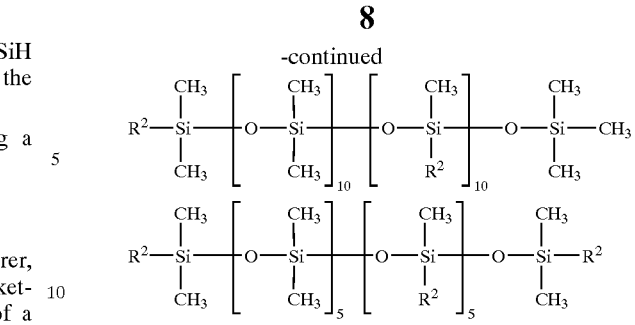

where $R^2$ corresponds for example in each case to the radical

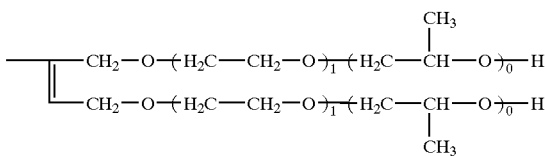

The organopolysiloxanes for use in accordance with the invention can be employed, for example, for the defoaming of polymer dispersions, paints, and printing inks.

For their inventive use as defoamers of aqueous media these organopolysiloxanes can be added diet in concentrations of from about 0.01 to about 3.0% by weight to the aqueous systems in which defoaming is to take place. An alternative option is to formulate these derivatives beforehand by for example dispersing organic or inorganic solids such as silicas, alumina, alkaline earth metal carbonates, alkaline earth metal salts of long-chain fatty acids, their amides or urea derivatives in these prior art siloxanes. The defoamers for use in accordance with the invention can also be employed in the form of their aqueous emulsions. Emulsions are frequently employed with preference on account of their greater ease of metering and the fact that droplet distributions are already established. Particular preference is given in this context to defoamer emulsions whose average particle diameter lies between about 1 and about 10 µm. Such emulsions may then contain between about 5 and about 50% by weight of the components for use in accordance with the invention.

These organopolysiloxanes for use in accordance with the invention may of course also be formulated together with other, prior art defoamer oils, such as silicone oils, polyether siloxanes, fatty alcohol derivatives or fatty acid derivatives or polyethers, for example.

The invention is illustrated below by means of examples. Examined for this purpose are the organopolysiloxanes E1 to E7 for use in accordance with the invention and also the comparison defoamers V8 Tego® Foamex 810 (Degussa), V9 Dehydran® 1293 (solution of a polyether siloxane copolymer, Cognis), and V10 Surfynol® 104 (Tetramethyldecynediol; Air Products).

The performance properties of the various compounds of the invention or compounds for use in accordance with the invention were examined using the following test systems, in which the amounts were in percent by weight:

Aqueous test systems:

1.) Solid-color aqueous base coat

| | | |
|---|---|---|
| Daotan VTW 6462 | 26.0 | dispersion of a urethane acrylate hybrid (Solutia) |
| Water | 10.0 | |
| AMP 90 | 0.2 | aminomethylpropanol (Angus) |
| Viskalex HV 3 | 1.6 | acrylate thickener |
| Water | 30.0 | |
| Black dye | 4.4 | |
| Viacryl VSC 6254 | 5.8 | styrene acrylic dispersion (Solutia) |
| Water | 21.8 | |

0.2% by weight in each case of the inventive and noninventive defoamers, as the final formula ingredient, were incorporated by dispersion at 1000 rpm using a perforated disk for 2 minutes. 45 g of the paint were then poured into a graduated cylinder and measurements were made of the foam height in ml and of the time taken for the foam to collapse to a residual volume of <1 ml. The remaining, prior art paint material was then applied on a cathodic electrocoat primer, and following a flash-off time of 10 minutes at room temperature the system was baked first at 80° C. for 10 minutes and finally at 140° C. for 20 minutes. The dry coating was inspected for surface defects. Assessment was made on a scale from 1 to 6, where 1 describes a defect-free film while 6 attests to severe wetting defects.

2.) Surfacer formula

| | | |
|---|---|---|
| Resydrol VAZ 5541W/42WA | 23.0 | alkyd resin (Solutia) |
| Dispers 750 W | 1.5 | dispersing additive (Tego) |
| Butylglycol | 1.5 | |
| N-methyl-pyrrolidone | 1.0 | |
| Kronos 2190 | 14.0 | titanium dioxide (Kronos) |
| Blanc fixe micro | 14.0 | filler (Omya) |
| Printex U | 0.2 | carbon black (Degussa) |
| Resydrol VAZ 5541W/42WA | 42.5 | alkyd resin (Solutia) |
| Water | 2.0 | |

0.3% by weight of each of the inventive and noninventive defoamers, as the final formula ingredient, was incorporated by dispersion at 3000 rpm using a toothed-wheel disk for 3 minutes. 45 g of the paint were then poured into a graduated cylinder and measurements were made of the foam height in ml and of the time taken for the foam to collapse to a residual volume of <1 ml. Thereafter the remaining prior art paint material was applied to a cathodic electrocoat primer, and after a flash-off time of 10 minutes at room temperature the system was baked first at 80° C. for 10 minutes and finally at 160° C. for 25 minutes. The dry coating was assessed visually as described above.

3) Overprint varnish

| | | |
|---|---|---|
| Joncryl 8085 | 39.8 | styrene acrylic solution (Johnson Polymer) |
| Joncryl 90 | 35.9 | styrene acrylic dispersion (Johnson Polymer) |
| Joncryl 77 | 9.7 | acrylate emulsion (Johnson Polymer) |
| Jonwax 35 | 4.9 | polyethylene wax emulsion (Johnson Polymer) |
| Butylglycol | 4.9 | |
| Water | 3.9 | |

The print varnish was formulated in accordance with the formula above. The final formula ingredient added was in each case 0.2% by weight of the inventive and noninventive defoamers, incorporation taking place at 1500 rpm using a bead mill disk for 3 minutes. Subsequently, once again, 45 g were weighed out into a standing cylinder and the foam height in ml was recorded. The time taken for the foam height to fall below 1 ml was measured. Thereafter the remainder of the print varnish was knifecoated onto a transparent PVC sheet using a 12$\mu$ spiral applicator. Any wetting defects induced by the defoamer were evaluated as described above on a scale from 1 to 6.

Test system 1: (Solid-color aqueous basecoat)

| Compound | Foam height in ml/ 45 g | Foam breakdown time in s. | Wetting (scale 1–6) |
|---|---|---|---|
| — | 77 | >1000 | 2 |
| E1 | 48 | 5 | 1 |
| E2 | 45 | 5 | 1 |
| E3 | 47 | 5 | 1 |
| E4 | 47 | 5 | 1 |
| E5 | 48 | 3 | 1 |
| E6 | 45 | 5 | 2 |
| E7 | 45 | 3 | 1 |
| Surfynol 104 | 54 | 20 | 2 |
| Foamex 810 | 45 | 15 | 5 |
| Dehydran 1293 | 57 | 150 | 4 |

Test system 2: (Surfacer)

| Compound | Foam height in ml/ 45 g | Foam breakdown time in s. | Wetting (scale 1–6) |
|---|---|---|---|
| — | 78 | >500 | 2 |
| E1 | 50 | 10 | 1 |
| E2 | 49 | 5 | 1 |
| E3 | 47 | 5 | 1 |
| E4 | 51 | 15 | 1 |
| E5 | 53 | 3 | 1 |
| E6 | 49 | 5 | 2 |
| E7 | 47 | 5 | 2 |
| Surfynol 104 | 53 | 60 | 3 |
| Foamex 810 | 49 | 100 | 5 |
| Dehydran 1293 | 54 | 220 | 3 |

Test system 3: (aqueous overprint varnish)

| Compound | Foam height in ml/ 45 g | Foam breakdown time in s. | Wetting (scale 1–6) |
|---|---|---|---|
| — | 82 | >2000 | 2 |
| E1 | 48 | 20 | 1 |
| E2 | 51 | 15 | 2 |
| E3 | 46 | 5 | 1 |
| E4 | 49 | 10 | 1 |
| E5 | 50 | 5 | 1 |
| E6 | 49 | 5 | 2 |
| E7 | 47 | 5 | 1 |
| Surfynol 104 | 47 | 50 | 2 |
| Foamex 810 | 45 | 50 | 5 |
| Dehydran 1293 | 54 | 100 | 3 |

As can be seen from the test results described above the siloxane derivatives for use in accordance with the invention feature effective foam suppression coupled with extremely rapid foam destruction without the appearance of the wetting defects that other defoamers induce. They accordingly achieve an innovative balance between compatibility and incompatibility unachievable to date with prior art defoamers.

The above description is intended to be illustrative and not limiting. Various changes and modifications in the embodiments described herein may occur to those skilled in the art. Those changes can be made without departing from the scope or spirit of the invention.

What is claimed is:

1. A method for defoaming aqueous media which comprises adding to the aqueous media an organopolysiloxane derivative of the general average formula (I)

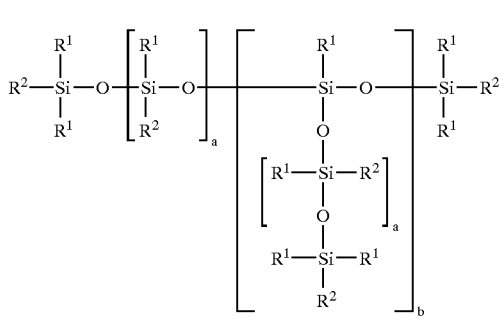

(I)

where the radicals $R^1$ are alky radicals or aryl radicals, but at least 80% of the radicals $R^1$ are methyl radicals, $R^2$ in the molecule are identical or different and have the following definitions:

(a)

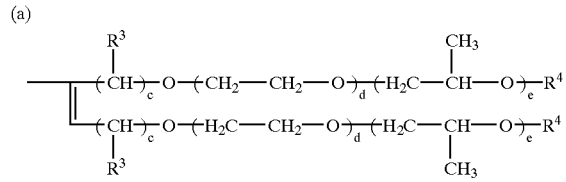

in which $R^3$ is a hydrogen or alkyl radical, $R^4$ is a hydrogen, alkyl or carboxyl radical, c is a number from 1 to 20, d is a number from 0 to 50, e is a number from 0 to 50 or (b)

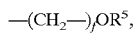
—$(CH_2—)_fOR^5$, in which $R^5$ is a hydrogen, alkyl or carboxyl radical or a dimethylol propane radical containing ether groups if desired, and f is a number from 2 to 20 or c)

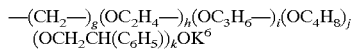
—$(CH_2—)_g(OC_2H_4—)_h(OC_3H_6—)_i(OC_4H_8)_j$
$(OCH_2CH(C_6H_5))_kOK^6$ in which $R^6$ is a hydrogen, alkyl or carboxyl radical, g is a number from 2 to 6, h is a number from 0 to 20, i is a number from 1 to 50, j is a number form 0 to 10, k is a number from 0 to 10 or (d)

correspond to the radical $R^1$, with the proviso that in the average molecule at least one radical $R^2$ has the definition (a), a is a number from 1 to 500, b is a number from 0 to 10.

and wherein the water solubility of the organopolysiloxane is such that it forms a clear solution in water in an amount not more than 20 g/l at 25° C.

2. The method according to claim 1, where b=0 in the organopolysiloxane derivative.

3. The method according to claim 1, where in the organopolysiloxane derivative the radicals $R^1$ are methyl radicals, a=1 to 50 and b=0.

4. The method according to claim 1, where $R^3$ is hydrogen in the organopolysiloxane derivative.

5. The method according to claim 1, where $R^4$ is hydrogen or an acyl radical in the organopolysiloxane derivative.

6. The method according to claim 1, where the index c=1 or 2 and d and e independently of one another arm from 0 to 10 in the organopolysiloxane derivative.

7. The method according to claim 1, where $R^6$ is hydrogen or a methyl radical, g=3, h=0 to 12, i=8 to 30 and j and k independently of one another are <5, in the organopolysiloxane derivative.

8. The method according to claim 7, where j and k are zero in the organopolysiloxane derivative.

9. The method according to claim 1, wherein the organopolysiloxane forms a clear solution in water in an amount not more than 5 g/l.

10. The method according to claim 1, wherein the aqueous media is an aqueous surfactant system.

11. The method according to claim 1, wherein the aqueous media is a printing ink or an ink.

12. The method according to claim 1, wherein the aqueous media is an aqueous coating material.

13. The method according to claim 1, wherein the aqueous media is a polymer dispersion.

14. The method according to claim 1, wherein the organopolysiloxane has an average structure selected from the group consisting of

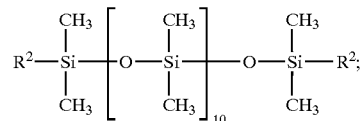

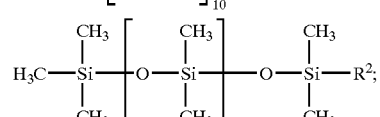

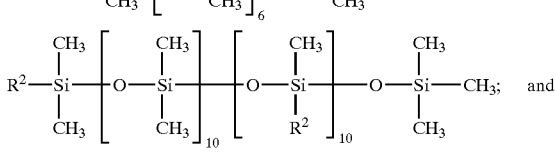

-continued

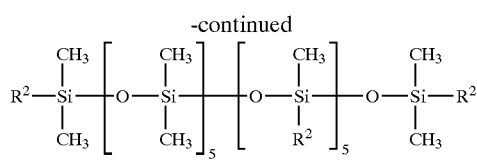

where
R² is a radical of the formula

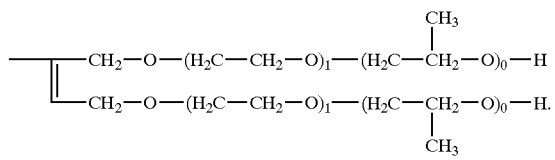

15. A method for defoaming aqueous media which comprise adding to the aqueous media an organopolysiloxane derivative of the general average formula (I)

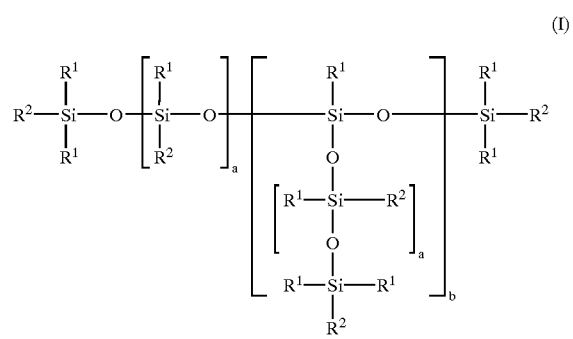

where the radicals
R¹ are alkyl radicals having 1 to 4 carbon atoms or aryl radicals, but at least 80% of the radicals R¹ are methyl radicals,
R² in the molecule are identical or different and have the following definitions:

(a)

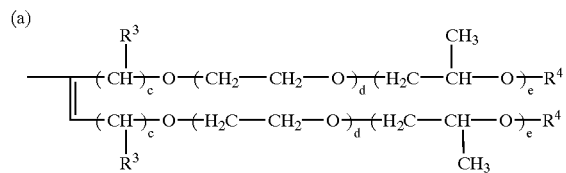

in which
R³ is a hydrogen, alkyl radical
R⁴ is a hydrogen, alkyl or carbonyl radical,
c is a number from 1 to 20,
d is a number from 0 to 50,
e is a number from 0 to 50,
(b)

$-(CH_2-)_fOR^5$, in which
R⁵ is a hydrogen, alkyl or carboxyl radical, or a dimethylol propane radical containing ether groups if desired, and
f is a number from 2 to 20 or c)

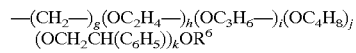

in which
R⁶ is a hydrogen, alkyl or carboxyl radical,
g is a number from 2 to 6,
h is a number from 0 to 20,
i is a number from 1 to 50,
j is a number from 0 to 10,
k is a number from 0 to 10, or
(d)
correspond to the radical R¹,
with the proviso that in the average molecule at least one radical R² has the definition (a),
a is a number from 1 to 500, and
b is a number from 0 to 10
and wherein the water solubility of the organopolysiloxane is such that forms a clear solution in water in an amount not more than 20 g/l at 25° C.

16. A defoamer emulsion, which comprises from about 5 to about 50% of at least one water-insolule organopolysiloxane derivative of the general average formula (I)

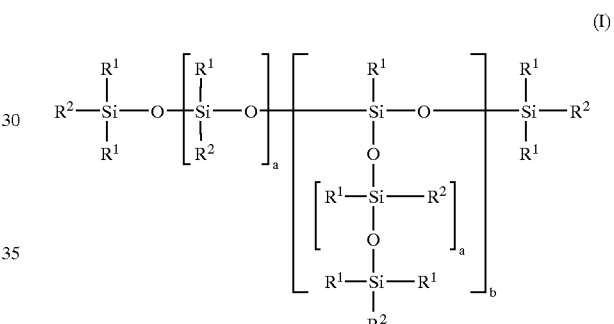

where the radicals
R¹ are alkyl radicals or aryl radicals, but at least 80% of the radicals R¹ are methyl radicals,
R² in the molecule are identical or different and have the following definitions:

(a)

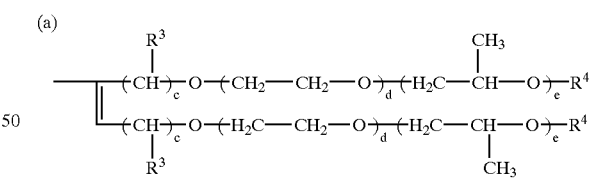

in which
R³ is a hydrogen, alkyl radical
R⁴ is a hydrogen, alkyl or carbonyl radical
c is a number from 1 to 20,
d is a number from 0 to 50,
e is a number from 0 to 50,
(b)

$-(CH_2-)_fOR^5$, in which
R⁵ is a hydrogen, alkyl or carboxyl radical, or a dimethylol propane radical containing ether groups if desired, and f is a number from 2 to 20 or c)

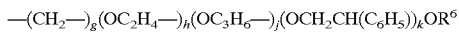

in which

R⁶ is a hydrogen, alky or carboxyl radical, g is a number from 2 to 6, h is a number from 0 to 20, i is a number from 1 to 50, j is a number from 0 to 10, k is a number from 0 to 10, or (d)

correspond to the radical R¹, with the priviso that in the average molecule at least one radical R² has the definition (a), a is a number from 1 to 500, b is a number from 0 to 10, and wherein the organopolysiloxane forms a clear solution in water in an amount not more that 20 g/l at 25° C.

water, and optionally an auxiliary or additive.

17. An ink or a paint which comprise a pigment and a defoam emulsion according to claim 16.

18. A polymer dispersion which comprises a polymer and a defoam emulsion according to claim 16.

19. An aqueous coating material which comprises an emulsion according to claim 16.

* * * * *